United States Patent [19]
Bernier et al.
[11] 3,939,547
[45] Feb. 24, 1976

[54] METHOD OF PRODUCING A DYEABLE COATING ON METAL ARTICLE

[75] Inventors: Lornie J. Bernier, Guys Mills; Tapan K. Das, Meadville, both of Pa.

[73] Assignee: Textron, Inc., Providence, R.I.

[22] Filed: Aug. 28, 1974

[21] Appl. No.: 501,371

[52] U.S. Cl. .......... 29/408; 8/4; 24/205 R; 148/6.15 R; 427/195
[51] Int. Cl.[2] .......... B21D 53/50; B29D 5/00
[58] Field of Search .......... 29/408; 8/3, 4; 28/74 R; 148/6.15 R; 427/195; 24/205 R; 260/2, 37, 47

[56] References Cited

UNITED STATES PATENTS

| | | | |
|---|---|---|---|
| 2,245,335 | 6/1941 | Frey | 29/408 X |
| 2,334,000 | 11/1943 | Hamm | 8/4 |
| 2,974,059 | 3/1961 | Gemmer | 427/195 X |
| 3,183,113 | 5/1965 | Gemmer | 427/195 X |
| 3,207,358 | 9/1965 | Fliss | 427/195 X |
| 3,743,529 | 7/1973 | Ramsay | 427/195 |

*Primary Examiner*—Victor A. Di Palma
*Attorney, Agent, or Firm*—O'Brien & Marks

[57] ABSTRACT

In producing a dyeable coating on a metal article, such as a slider on a slide fastener, the article is coated with a powdered solid polymer resin containing active proton acceptor groups, such as amine groups. The powder coating is heated to convert the powder coating into a polymer film which is capable of being dyed by any of a wide variety of dyes to produce a desired color in the polymer film. During the heating, the temperature is maintained below the temperature at which substantially all the active proton acceptor groups would be transformed or rendered inactive.

5 Claims, 8 Drawing Figures

FIG. 1
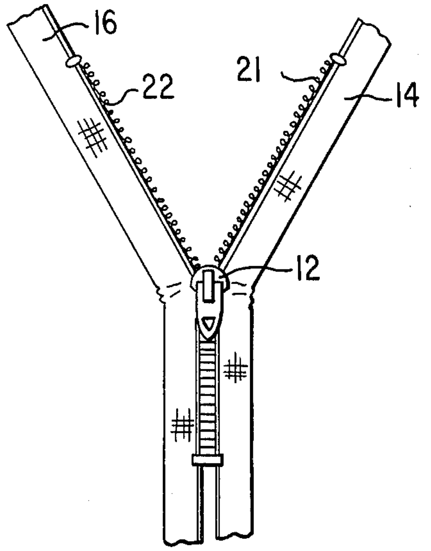
FIG. 2
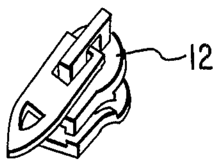
FIG. 3
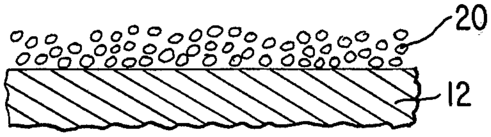
FIG. 4
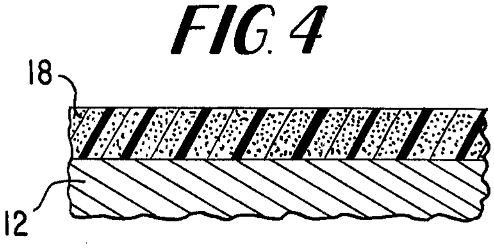
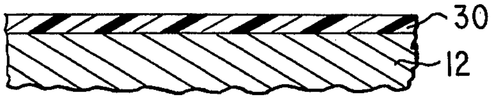
FIG. 5
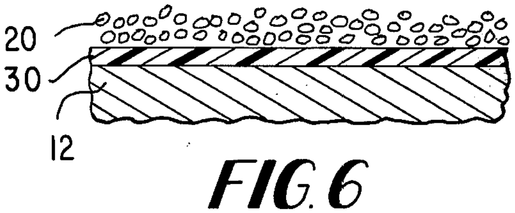
FIG. 6
FIG. 7
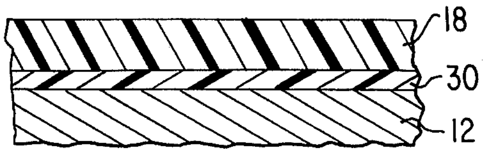
FIG. 8
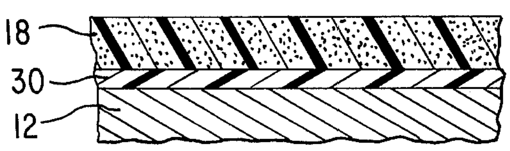

METHOD OF PRODUCING A DYEABLE COATING ON METAL ARTICLE

BACKGROUND OF THE INVENTION

1. Field of the Invention

The invention relates to methods for producing colored coatings on metal articles or elements, and in particular, to methods of forming coatings on metal articles which can be dyed.

2. Description of the Prior Art

The prior art, as exemplified in U.S. Pat. Nos. 2,042,451, 2,334,000, 2,535,794, 3,544,351, 3,615,894, and 3,647,567, includes a number of processes for producing various coatings, including colored coatings, on metal articles. Presently in the manufacture of textile articles with metal fastener elements, such as slide fasteners with metal sliders, the elements are coated with liquid enamel paints which include pigments selected to produce coatings of the desired color when the paints dry or solidify, while the textile portions of the articles are dyed separately from the metal elements; then the enameled fastener elements are attached to the articles to produce completed color-coordinated articles. The separate enameling of the metal slider elements requires the maintenance of an inventory of numerous different color paints as well as complex general planning to coordinate the production activity of each of the articles to be provided with different color metal fastener elements.

The above U.S. Pat. No. 2,334,000 discloses a particular process wherein metal sliders are coated with a white enamel, assembled on white tapes, and then subjected to a dye process to form a colored slide fastener. There have also been previous attempts to form dyeable metal sliders by coating with a polymer; such coatings have been made from dry powder epoxy coatings and from nylon coatings, dry powder nylon coatings being well known in the prior art. The formation of a suitable dyeable coating on sliders and the dyeing of the coating have generally not been commercially successful; the prior art coatings were unevenly dyed, did not readily pick up colors from dyes, or often resulted in colors from certain dyes which substantially differ from or conflict with the colors produced in the slide fastener tapes. Also, the prior art coatings could not withstand the acid mediums employed in many conventional dye processes, or easily chipped and peeled off and thus could not withstand the handling, such as tumble drying, normally given to garments.

The prior art contains a number of prior art processes utilizing baths, including electrostatically charged powder sprays, of powdered polymer resins, including epoxy resins and nylon resins, for producing polymer films or coatings on metal articles. U.S. Pat. Nos. 3,028,251, 3,058,951, 3,321,438, 3,442,856, 3,506,598, 3,102,823, 3,697,331, and 3,758,633 disclose particular epoxy resins for coatings. The powder resins generally contain pigments, such as titanium dioxide and the like, for producing a coating of a desired color. Some of the polymer coatings, particularly the epoxy coatings, have been known for their adherence, durability, and resistance to chemical attack. However, the required powder bath coating equipment and its limited suitability for being repeatedly and conveniently changed to produce different colored coatings along with the higher cost of materials has prevented any extensive adoption of pigment colored powder bath coatings in coating color matching metal fastener elements for dyed articles.

Dyes in the prior art have been successfully utilized to color a variety of materials including fabrics and, as illustrated in U.S. Pat. No. 2,854,367, phosphate treated metal surfaces. The dyes have been divided into a number of general classes, such as acid dyes, direct dyes, disperse dyes, mordant dyes, fiber reactive dyes, basic dyes, azoic dyes, etc. according to their use or properties. Acid dyes are water-soluble anionic dyes that are applied to nitrogenous fibers such as wool, silk, nylon and modified acrylic fibers, from acid or neutral baths; attachment of color groups to the fiber is attributed at least partly to salt formation between anionic groups in the dyes and cationic groups in the fiber. Active amino groups exhibit a basic nature which has been attributed to their ability to attract and dissociate a proton from $H_2O$ thus forming a cationic group and a free hydroxyl ion. Direct dyes are also considered to be generally anionic in nature and substantive to cellulosic fibers in the presence of an electrolyte such as salt. Disperse dyes are substantially water-insoluble dyes held in aqueous solution by anionic dispersing agents. The disperse dyes are generally believed to migrate from the dispersion, sometimes with the aid of a carrier, into the fibers where the dyes remain due to their insolubility; in nylon fibers hydrogen bonds between amino groups in disperse dyes and carbonyl groups in the nylon fibers may contribute to fixation. Mordant dyes and azoic dyes generally require the reaction of two components in situ in the fiber to produce an insoluble molecule. Although the prior dyeing art is extensive, the various properties of dyes and their application to various materials is not completely understood.

SUMMARY OF THE INVENTION

The invention is summarized in that a method of producing a dyeable coating on a metal article includes the steps of depositing on the metal article a coating of a powdered solid polymer resin containing active proton acceptor groups which are subject to irreversible transformation by heating above a predetermined temperature, and heating the coating sufficiently to convert the coating into a coherent polymer film but below the predetermined temperature to maintain a substantial quantity of the active proton acceptor groups untransformed.

An object of the invention is to formulate a process for producing dyeable coatings on metal articles wherein a wide variety of colors may be produced by dyeing with respective dyes selected from a large number of suitable but different dyes.

Another object of the invention is to form colored coatings on metal elements which are closely matched with dyed articles.

It is also an object of the invention to eliminate the necessity of maintaining inventories of a large number of different color painting materials to form different color coatings on articles.

An advantage of the invention is that complex planning concerning the forming of different color coatings on metal fastener elements corresponding to different color garments is eliminated.

Other objects and advantages of the invention will be apparent from the following description taken in conjunction with the accompanying drawings.

BRIEF DESCRIPTION OF THE DRAWINGS

FIG. 1 is a plan view of a slide fastener including a metal slider which may be color coated in accordance with the invention.

FIG. 2 is a perspective view of the metal slider of FIG. 1.

FIG. 3 is a detailed cross section view of a portion of the slider in FIG. 2 after one step in the coating process.

FIG. 4 is a view similar to FIG. 3 after a final step in the coating process.

FIG. 5 is a detailed cross section view of a portion of a slider after one step in a modified coating process.

FIG. 6 is a view similar to FIG. 5 after a further step in the modified coating process.

FIG. 7 is a view similar to FIGS. 5 and 6 after a later step in the modified coating process.

FIG. 8 is a view similar to FIGS. 5, 6, and 7 after a still later step in the modified coating process.

DESCRIPTION OF THE PREFERRED EMBODIMENT

The invention is embodied in a process for forming a colored article, such as a slide fastener shown in FIG. 1, having a metal element, such as a slider 12, with a colored coating matching the color of other portions of the article, such as textile stringer tapes 14 and 16. A dyeable polymer film 18, FIG. 4, is formed on the slider 12 by first coating with a powdered solid polymer resin 20, FIG. 3, and then heating the powdered resin to convert the coating 20 into the coherent film 18. The slider 12 is assembled on fastener elements 21 and 22 of the tapes 14 and 16 which are initially undyed. The article may include other undyed portions, such as a textile garment (not shown) having a seam opening to which the fastener is secured for opening and closing the seam. Then the entire article including the polymer coated metal slider 12 is subjected to a dyeing process, as indicated by the stipling in FIG. 4, to form a colored article which has the color of the polymer film 18 on the metal slider 12 matching the color of the rest of the article including the textile tapes 14 and 16.

It has been discovered that certain polymer coatings, particularly polymer coatings containing a substantial quantity of active proton acceptor groups, result in substantially improved color pickup when subjected to dye colutions. Metal articles having such polymer coatings when subjected to a dye process, will pickup substantially more color from a dye than a polymer coating not having such a substantial quantity of available proton acceptor groups. Certain polymer coatings, such as coatings produced from an epoxide resin and an amine, produce colors which closely match the colors produced in synthetic textile materials, such as those made from any of the common nylon fibers and the common polyester fibers, when dyed together. Other polymer coatings can be readily matched with dyed textile materials by dyeing separately with a different dye or a different duration.

The term "proton acceptor groups" includes those basic acting radicals, such as primary, secondary and tertiary amine groups, which are believed capable of attracting and dis-associating a proton from $H_2O$ to form a cationic group and a free hydroxyl ion. Amines from a covalent bond with a proton and thereby become "quaternized."

The powdered polymer resin can be, for example, a powered epoxy resin, a powdered nylon resin, or a powdered copolymer resin containing a polyester or acrylic resin. All of the resins when formed into a film must have active proton acceptor groups. The powdered nylons generally all contain active proton acceptor groups while the epoxides, polyesters and acrylics often must contain other materials, such as cross-linking or curing agents, with active proton acceptor groups.

There are several nylon resins commercially available and which can be dyed. Among the nylons, nylon-11 nylon-6, nylon-6,6 and copolymer nylon-6,6 and nylon-6,10 have been used in making film coatings utilizing a powder deposition process. Nylon-11 has a greater differential between its melting temperature and its decomposition temperature and has been found to be favored for producing nylon coatings by powder coating processes.

Polyester copolymers suitable for dyeing include those containing amine groups, such as a polyamide resin containing amine groups or epoxy resins with amine curing agents.

Of the acrylic resins, the polyacrylamides containing amine groups are suitable for dyeing. Also, the acrylic copolymers containing amine resins or epoxy resins with amine curing agents are suitable for dyeing.

Coatings from epoxy resins have been found to be superior, both as to durability and dye color pickup to the other polymers. The term "epoxy resins" refers to those compositions containing epoxides, i.e., compounds containing one or more epoxy groups. As is illustrated by the descriptions in U.S. Pat. Nos. 3,028,251, 3,058,951, 3,321,438, 3,442,856, 3,506,598, 3,120,823 3,697,331 and 3,758,633, a wide variety of epoxy compounds can be utilized for making suitable solid epoxy resins. Typical epoxides for powder coatings are those made from the reaction of epichlorohydrin (1-chloro-2,3 epoxy propane) and hydroxyl compounds, such as bisphenol A[2,2-bis (p-hydroxyphenyl)propane], phenol-formaldehyde novolac resin, resorcinol, glycerol, and the like.

The powder epoxy resin compositions also contain a curing agent which either promotes homopolymerization of the epoxide or forms a copolymer therewith. Conveniently the curing agent has proton acceptor groups to contribute the basic radicals in the cured film. The curing agent may be mixed with the epoxide in any suitable manner, i.e., a solid curing agent powder mixed with a solid epoxide powder, or the curing agent may be incorporated with the epoxide in a partially reacted solid epoxy resin commonly referred to as a B-stage resin. There are a great many curing agents including the aromatic amines, polyaliphatic amines, dicyanamide etc. which form active proton acceptor groups when employed in epoxy resins. Amine curing agents may be primary, secondary or tertiary. Reference is made to the descriptions of the U.S. Pat. Nos. 3,028,251, 3,058,951, 3,321,438, 3,442,856, 3,506,598, 3,102,823, 3,697,331 and 3,758,633 for suitable amine curing agents.

Additionally the polymer resin material may contain other ingredients, such as heat activated catalysts, pigments, fillers, etc. Where the color of a polymer film on a metal element is to closely match a garment when dyed together with the garment, a white pigment, such as titanium dioxide, is included in the polymer resin.

A wide variety of dyes in various classes of dyes have been found to produce colors with excellent intensity and uniformity in the polymer film 18. Examples of dyes classified as acid dyes in the Colour Index, Third Edition, 1973, by The Society of Dyers and Colourists, Great Britain, and the American Association of Textile Chemists and Colorists, U.S.A., and which have been found suitable include: Colour Index No. 15510 Acid Orange 7; Colour Index 18950 Acid yellow 40; Colour Index No. 17025 Acid Violet 1 and Colour Index No. 42655 Acid Blue 90. Particular disperse dyes which have been found suitable include FORON Brilliant Yellow SE-6GFL from Sandoz Inc., Hanover, N.J., USA, classified as Colour Index Disperse Yellow 49; Foron Red E-G from Sandoz classified as Colour Index Disperse Red 65; RESOLIN Yellow 7 GL from Bayer Aktiengesellschaft, Leverkusen, Germany, classified as Colour Index Disperse Yellow 73; and RESOLIN Blue FBLD from Bayer classified as Colour Index Disperse Blue 71. Additional suitable dyes include FORON Brilliant Blue E-GFLN from Sandoz; RESOLIN Scarlet PGG from Bayer; and DURONYL Yellow G from Ciba Geigy Corporation, Andsley, N.Y., U.S.A. classified as Colour Index Acid Orange 1. Dyes sold in the United States under the Trademark RIT have also been found to produce acceptable color in the polymer coatings. Anionic dyes such as acid dyes and direct dyes in aqueous solutions are believed to be fixed by salt formation with the cationic sites produced by the proton acceptor groups in the polymer film. Other types of dyes, such as disperse dyes, azoic dyes and mordant dyes are believed to be at least aided by the presence of the proton acceptor groups in penetration or reaction to become fixed in the polymer film.

it has been found that it is necessary to limit the temperature used during heating the coating 20 of powdered polymer resin to form the film 18. If the temperature is allowed to exceed a predetermined temperature, substantially all the proton acceptor groups undergo irreversible transformation, either by decomposition, becoming buried in the polymer film structure, reaction such as crosslinking, or the like, and the dyeability of the polymer film is substantially impaired. This predetermined temperature is generally substantially less than the temperature at which the polymer is degraded in strength, i.e. the temperature at which depolymerization or oxidation can occur. However, the temperature must be allowed to exceed the melting point of the powdered solid polymer resin to allow the powder to coalesce into a coherent film. The duration of the heating should also be limited to less than a predetermined duration since substantially complete transformation of the proton acceptor groups in polymer resins can occur at lower elevated temperatures over extended periods of time. Transformation of at least some of the proton acceptor groups in certain polymer resins, such as the epoxy resins, is necessary to allow crosslinking reaction during the heating cycle; but the heating must be stopped short of substantially complete transformation to allow a residual quantity of the proton acceptor groups to remain untransformed or active. For epoxy resins with amine curing agents, nylons, and copolymers with amine materials, the temperature is maintained generally below about 205°C (400°F) and preferrably should not exceed about 191°C (375°F); and heating at a temperature approaching 191°C should be limited to about 25 minutes, longer time periods being acceptable for lower temperatures.

The empolyment of smaller particles of powdered polymer resin aids in the color pickup from dye solutions; this is particularly noticeable with resins, such as Nylon-11, which are formed somewhat deficient in active proton acceptor groups. The milling of the polymer resin to produce the finely divided particles is believed to produce a change in chemical structure of the polymer which results in more active proton acceptor groups being available. Also, the smaller particles tend to produce a more porous film which allows better penetration of the dye solutions and thus better dyeing characteristics than films formed with larger particles of powder. Generally, powders having an average particle size less than about 200 microns and preferrably less than about 150 microns produce superior results. The small particle size has another advantage in producing films on small articles such as sliders in that thinner dyeable films are possible using smaller particle powders, the thinner films interfering less with slider operation in slide fasteners than the thicker films produced by prior art coatings. For sliders, the coating should have a thickness generally in the range of about 12 to 153 microns (0.5 to 6 mils) and preferrably in the range of about 20 to 127 microns (0.9 to 5 mils).

Preferably the coating 20 on the metal element 12 is applied by an electrostatic spray process although other applying processes may be employed. Films formed from electrostatic powder sprays are generally superior in being more even, and thinner than films formed by other processes. The solid powders are preferrably melted and/or reacted in an oven to form the films but other heating techniques may be used with good results.

One particular advantage of having sliders formed with a dyeable coating is that a garment, such a dress, of one color could be dyed to a new color and the metal slider will be dyed to the new color along the rest of the garment.

The adherence and durability of the coating 18 is improved by first treating the metal article 12 with a conventional treatment used to form suitable base surfaces for conventional painting processes and the like; prior to treating, it may be necessary or desirable to initially clean and degrease the metal articles. Typical treatment processes for articles made from alloys which are principally zinc or aluminum include dipping the article in a chromating solution, such as (1) a concentrated sodium dichromate solution which is slightly acidified with sulfuric acid, (2) a chromic acid solution containing one or more mineral acids (i.e. sulfuric acid, nitric acid, etc.) and a low molecular weight organic acid (i.e. formic acid, acetic acid, etc.), or (3) any of the several commercial chromating solutions which are acceptable for treating zinc or aluminum. Where the article is a ferrous alloy, the article can be subjected to a phosphoric treating process. Typical phosphoric treating processes include treating with (a) solutions containing phosphoric acid, stabilizers such as dihydrogen phosphate and accelerating agents such as copper salts, nitrates, nitrites, etc., (2) phosphoric acid solutions containing phosphates or iron, manganese, and zinc, and (3) any of several commercially available phosphoric treating solutions suitable for treating ferrous metals. It is generally believed that the chromate and phosphoric treating processes produce complexes at the metal surfaces which improve the bonding of many materials to the metal.

A modified process, illustrated in FIGS. 5, 6, 7 and 8 includes the application of a phenol aldehyde polymer layer or film 30 to the metal article 12 prior to deposition of the powder coating 20. The layer 30 is perferrably formed by dipping in a liquid solution of a phenol aldehyde resin, spinning to remove excess solution and then heating to evaporate the solvent and cure or polymerize the phenol aldehyde resin. The layer 30 is formed as thin as possible while still completely covering the article 12. Generally films less than about 13 microns (0.5 mils) thick and preferrably about 2.5 to 5 microns (0.1 to 0.2. mils) thick will cover the article sufficiently to provide a good base for the polymer film 18.

The phenol aldehyde layer 30 is a primer providing a base layer which improves the adherence and durability of the dyeable polymer film 18. The phenol aldehyde layer 30 has been discovered to particularly impart improved resistivity against a tendency for the polymer film 18 to blister and become loosened from the article 12 when subjected to an acidic dye solution.

The phenol aldehyde layer 30 has another advantage in that it will react with crosslinking type polymer resins, particularly epoxy resins, to impart a substantially improved toughness and durability to the polymer film 18. The grafting or crosslinking across the interface between the layer 30 and the film 18 renders the polymer film 18 more adherent and thus less likely to chip or crack during subsequent processing and handling.

EXAMPLE 1

A batch of metal sliders for slide fasteners are coated by an electrostatic spray with epoxy resin powder No. 89-910 from Pratt & Lambert, Inc., Buffalo, N.Y. USA. The epoxy resin powder No. 89-910 has an average particle size less than 200 microns and includes an epoxide compound, an amine curing agent, and a white pigment. Then the sliders are placed within a convection type oven having a temperature of about 182° C (360°F) for a period of about 25 minutes to form a polymerized film of approximately 51 microns (2 mils) on the external surfaces of the slider. The sliders are then assembled on slide fastener tapes made of nylon-6,6. Different groups of the assembled slide fasteners are subjected to the following dye solutions, respectively, in conventional dye processes: (a) ORCO Acid Orange from Ciba-Geigy (Colour Index No. 15510), (b) DUPONT Milling Yellow (Colour Index No. 18950), (c) ORCO Acid Violet from Ciba-Geigy (Colour Index No. 17025) (d) DURONYL Yellow G from Ciba-Geigy, (e) RESOLIN Blue FBLD from Bayer, (f) RESOLIN Scarlet PGG from Bayer, and (g) Acid Blue 90 (Colour Index No. 42655). The dye pickup is generally good in the slide fasteners and the colors of the coatings on the sliders are generally excellent in compatability to the fastener tapes.

EXAMPLE 2

A batch of metal sliders are spray coated and heated to form polymerized films thereon using the techniques and materials of Example 1. The sliders are then assembled on slide fastener types made of type 54 W polyester from DuPont, E. I. de Nemours & Co. Wilmington, Del. USA. Different groups of the assembled slide fasteners are subjected to the following dye solutions, respectively, in conventional dye processes: (a) RESOLIN Yellow 7 GL from Bayer, (b) FORON Brilliant Blue E-GFLN from Sandoz, (c) FORON Rubine S-2 BGL from Sandoz, and (d) FORON Red E-G from Sandoz. The dye pickup in the polymer film on the sliders is generally fair to very good and the color compatability between the sliders and the fastener tapes is good to excellent.

EXAMPLE 3

A batch of metal sliders for slide fasteners are coated by an electrostatic spray with a white Nylon-11 powder which was formed by milling white Nylon-11 to a particle size ranging from 18 to 150 microns. The sliders are placed within a convection type oven having a temperature of about 191° C (375°F) for about 10 minutes to form a polymerized film of approximately 76 microns (3 mils) on the external surfaces of the sliders. Different groups of the sliders are dyed utilizing the same dyes and dyeing techniques of Example 1. Dye pickup in the Nylon 11 coatings was generally fair.

EXAMPLE 4

A batch of zinc bodied sliders is treated by immersing in DUCHROME 115 P from DuTone Chemicals Co. Inc. Waukegan, Ill., USA for about 60 seconds. DUCHROME 115 P is a chromating solution. Different portions of the treated batch of sliders are then coated with polymer films and dyed using the materials and techniques of Examples 1, 2 and 3, respectively. The colored coatings have improved adherence to the sliders when subjected to tumbling as compared to the respective coating in Examples 1, 2 and 3.

EXAMPLE 5

A batch of zinc bodied sliders is treated with a chromating solution in a manner similar to Example 4. The treated batch of sliders is dipped into phenolic lacquer No. 4068 from Pratt & Lambert, Inc; phenolic lacquer No. 4068 is a solution of a material formed from a phenol formaldehyde reaction. The sliders are spun at high speed to remove excess lacquer and are placed within an oven and heated at about 142° C (287°F) for about 3 ½ minutes to form a base coating of about 3 microns. Different portions of the batch of sliders with the base coatings are then coated with polymer films and dyed using materials and techniques of Examples 1, 2 and 3, respectively. The coatings have substantially less tendency to blister and peel off during the dyeing processes than the respective coatings in Examples 1, 2, 3, and 4. Also the coatings have improved adherence, when subjected to tumbling and the like, over the coatings in the Examples 1, 2, 3, and 4.

Since many modifications, changes in detail and variations may be made to the presently described process, it is intended that all matters in the foregoing description and the accompanying drawings be interpreted as illustrative and not in a limiting sense.

What is claimed is:

1. A method of producing a color dyed non-metal article and attached matching metal element comprising the steps of forming a polymerized film containing a substantial quantity of active proton acceptor groups on the metal element, attaching the metal element to the article, and subjecting the article and the polymerized film on the attached metal element to an aqueous dye solution to produce a color-dyed article with a color matching metal element.

2. A method of forming a color-dyed article with a color matching metal element as claimed in claim 1 wherein the polymerized film includes a white pigment.

3. A method of forming a color-dyed article with a color matching metal element as claimed in claim 1 wherein the polymer film is formed from a resin which includes an epoxide compound and an amine.

4. A method of forming a color dyed article with a color matching metal element as claimed in claim 3 including the step of forming a base film of phenolic lacquer on the metal article prior to forming the polymerized film.

5. A method of forming a colored slide fastener having stringers and a metal slider comprising the steps of treating the slider to form an adherent surface on the slider, dipping the slider into a liquid solution containing an uncured phenol aldehyde resin, spinning the slider to remove excess liquid solution and form a film having a thickness less than about 13 microns, heating the slider to cure the phenol aldehyde film, electrostatically forming on the slider a coating of a powdered solid polymer resin having an average particle size less than about 200 microns and containing proton acceptor groups which are subject to irreversible transformation by heating above a predetermined temperature, heating the coating sufficiently to convert the coating into a coherent polymer film but below the predetermined temperature and for less than a predetermined duration to allow a substantial quantity of the proton acceptor groups to remain untransformed, assembling the slider on fastener elements of a pair of stringer tapes which are made from a textile material selected from the group consisting of polyester fabric and nylon fabric, and dyeing the slider and pair of stringer tapes to form a colored slide fastener.

* * * * *